United States Patent
Ljungström et al.

(10) Patent No.: US 7,184,782 B1
(45) Date of Patent: Feb. 27, 2007

(54) METHOD AND SYSTEM FOR CONNECTING SUBSCRIBERS PARTICIPATING IN SEVERAL TELECOMMUNICATION NETWORKS UNDER ONE TELEPHONE NUMBER

(75) Inventors: Patrik Ljungström, Königswinter (DE); Hubertus Gottschalk, Riedstadt (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/445,665

(22) PCT Filed: Jun. 9, 1998

(86) PCT No.: PCT/EP98/03448

§ 371 (c)(1),
(2), (4) Date: May 3, 2000

(87) PCT Pub. No.: WO98/57515

PCT Pub. Date: Dec. 17, 1998

(30) Foreign Application Priority Data

Jun. 9, 1997 (DE) .................... 197 24 122

(51) Int. Cl.
*H04Q 7/20* (2006.01)
(52) U.S. Cl. .............. 455/461; 379/219; 379/220.01
(58) Field of Classification Search .......... 455/414.1, 455/417, 426.1, 432.1, 432.3, 433, 435.1, 455/445, 461, 414; 379/201.01, 201.02, 379/211.02, 211.01, 212.01, 219, 220.01, 379/221.02, 221.01, 221.08–221.11, 221.12, 379/221.13
See application file for complete search history.

(56) References Cited

U.S. PATENT DOCUMENTS

| 5,504,804 A | * | 4/1996 | Widmark et al. ........... 455/461 |
| 5,909,650 A | * | 6/1999 | Jonsson ...................... 455/461 |
| 6,011,975 A | * | 1/2000 | Emery et al. ............. 455/456.1 |

FOREIGN PATENT DOCUMENTS

EP   0 738 093   10/1996

OTHER PUBLICATIONS

Jones D R: "Ain Network Capabilities for Wireless/Wireline Integration" Annual Review of Communications, vol. 50, 1997, pp. 923-930, XP000720958.
Kolipakam M V et al: "Personal Communications Services Using the Intelligent Network".

* cited by examiner

*Primary Examiner*—Joseph Feild
*Assistant Examiner*—Phuoc Doan
(74) *Attorney, Agent, or Firm*—Norris McLaughlin & Marcus, PA (57) ABSTRACT

The invention relates to a method and system for connecting subscribers participating in several telecommunication networks under one telephone number. The invention is characterized in that the subscriber data are stored in at least one telecommunication network and made available to the other telecommunication networks on request. To this end the invention provides for at least one of the telecommunication networks to have a data bank shared by all participating telecommunication networks.

18 Claims, 7 Drawing Sheets

| | GSM-based | | IN-based | |
|---|---|---|---|---|
| | Concept 1 | Concept 2 | Concept 3 | Concept 4 |
| Home Data Base | Separate Databases for Different Functions | One Database for all Functions | Two Synchronized Databases | One Database |
| Location Update in Wireline Network and | GSM-MAP | GSM-MAP | INAP with MAP-Container Termination in INS | INAP with MAP-Container |
| In Mobile Radio Network | GSM-MAP | GSM-MAP | GMS-MAP extended over the proprietary interface to SCP | INAP with MAP-Container |
| Incoming Calls from wireline to wireline | GSM-MAP ↻ TVSI→HLR<br>GSM-MAP ↻ HLR→VDB | INAP ↻ TVSI→HDB<br>GSM-MAP ↻ HDB→VDB | INAP ↻ TVSI→SCP<br>INAP+MAP ↻ SCP→VDB | INAP ↻ TVSI→HDB<br>INAP+MAP ↻ HDB→VDB |
| from wireline to mobile radio network | GSM-MAP ↻ TVSI→HLR<br>GSM-MAP ↻ HLR→VLR | INAP ↻ TVSI→HDB<br>GSM-MAP ↻ HDB→VLR | INAP ↻ TVSI→SCP<br>Propr. ↻ SCP→HLR<br>GSM-MAP ↻ HLR→VLR | INAP ↻ TVSI→HDB<br>GSM-MAP ↻ HDB→VLR |
| from mobile radio network to wireline (with service dial number) | GSM-MAP ↻ GMSC→HLR<br>GSM-MAP ↻ HLR→VDB | INAP ↻ GMSC→HDB<br>GSM-MAP ↻ HDB→VDB | INAP ↻ GMSC→SCP<br>INAP+MAP ↻ SCP→VDB | INAP ↻ GMSC→HDB<br>INAP+MAP ↻ HDB→VDB |
| from mobile radio network to mobile radio network (with service dial number) | GSM-MAP ↻ GMSC→HLR<br>GSM-MAP ↻ HLR→VLR | INAP ↻ GMSC→HDB<br>GSM-MAP ↻ HDB→VLR | INAP ↻ GMSC→SCP<br>Prop. ↻ SCP→HLR<br>GSM-MAP ↻ HLR→VLR | INAP ↻ GMSC→HDB<br>GSM-MAP ↻ HDB→VLR |

Figure 13

METHOD AND SYSTEM FOR CONNECTING SUBSCRIBERS PARTICIPATING IN SEVERAL TELECOMMUNICATION NETWORKS UNDER ONE TELEPHONE NUMBER

BACKGROUND OF THE INVENTION

1. Field of the Invention

The invention relates to a method and a device for connecting subscribers in several telecommunication networks under one dial number.

Telecommunication is currently executed, on one hand, over wired telecommunication networks, also referred to as wireline networks, and, on the other hand via wireless telecommunication networks, so-called mobile radio communication networks.

It would be desirable that a subscriber can be reached under one dial number independent of the networks the subscriber uses for making the call. Although modern telecommunication networks enable rerouting of telephone calls, i.e., calls for the subscriber which may be received, for example, via the mobile radio communication networks, can be rerouted to a predetermined number of a wireline network, this type of call rerouting, however, does not mean that the subscriber can be actually reached under a single dial number.

As a disadvantage, the subscriber has to establish call rerouting each time when needed and cancel the same when not needed. In addition, for rerouting the call, the actual dial number, to which the call is to be rerouted, has to be entered. If the subscriber changes his location or desires rerouting of the call to a different dial number, then this dial number has to be entered each time anew.

2. Description of the Related Art

In the article by Jones, D. R.: "AIN Network Capabilities for Wireless/Wireline Integration" in: Annual Review of Communications, Vol. 50, 1997, pp. 923–930, there is described a method for connecting subscribers in several telecommunication networks, wherein a dial number is assigned to the subscriber, under which number the subscriber can be reached. One of the telecommunication networks can be a mobile radio communication network and another telecommunication network can be a digital intelligent wireline network. A so-called follow-me-service is established. However, the wireline network is not expanded to include mobility functions. The follow-me-function is implemented by network-external devices, and the described functions correspond to conventional call transfer functions between several dial numbers in the participating communication networks.

A similar approach is described in the article by Kolipakam, M. V. et al.: "Personal Communications Services using the Intelligent Network" in Intelligent Networks, The Path to Global Networking, Proceedings of the International Council for Computer Communications, Intelligent Networks Conference, Tampa, May 4–6, 1992, pp. 384–390. In this case, too, no actual integration of the wireline network into the mobility management of the mobile radio communication network is provided.

EP-A-0 738 093 relates to a communication system, wherein a subscriber can be reached under a single personal dial number. However, the old network structures are preserved, meaning that a subscriber relationship with a respective specific network-internal dial number is established for each connected communication network. This described method has no impact on existing communication networks and, more particularly, does not implement a genuine mobility management based on a uniform database.

SUMMARY OF THE INVENTION

It is therefore an object of the invention, to provide a method and a device for connecting subscribers in several telecommunication networks under one dial number, so that the subscriber can be reached automatically at his/her current location under this dial number.

According to one advantage of the invention, mobility can be managed in the associated wireline network in the same way as in a mobile radio communication network, i.e., the subscriber can be reached also in the wireline network, under the dial number associated with the current location. Furthermore, a communication can advantageously be executed over the wireline network to save connection charges and to use the advantages of communicating over the wireline network, for example a better speech quality and higher transmission rates.

Important subscriber data are administered in a home data bank, wherein in a first embodiment, the home data bank performs the task of a Home Location Register (HLR) and an Intelligent Network System (INS).

The Home Location Register (HLR) and the Intelligent Network System (INS) are preferably not coupled with each other and perform separate functions. Both the Home Location Register (HLR) and the Intelligent Network System (INS) communicates via a Mobile Application Part (MAP) interface with the exchanges of the mobile radio communication network as well as with the exchanges of the wireline network.

To enable coupling of the telecommunication networks, the subscriber profile of the Home Location Register (HLR) and the Visitor Location Register (VLR) of the mobile radio communication network must be expanded in such a way that the existing and future services of the wireline network can be mapped. The functions of the mobility management of the mobile radio communication network are also expanded to the wireline network. A Visitor Database (VDB), which communicates with the Home Database (HDB) and temporarily manages relevant portions of the subscriber data, is located in the respective exchanges of the telecommunication networks.

Signaling between the terminals and the exchanges of the wireline network is performed via a signaling channel (D-channel) which is expanded to include mobility functions. The exchanges of the wireline network include MAP implementations with interworking to the α-interface.

It is important for executing the mobility management that the location of the subscriber is transmitted to and registered with the Home Location Database using MAP signaling during inscription via the wireline network.

The terminal for communicating via the mobile radio communication network and also via the wireline network is a mobile radio communication terminal. The mobile radio communication terminal of the subscriber can be connected to the wireline network through home base stations or through a cordless base station. The mobile radio communication terminal supports either only the GSM standard or, as a so-called dual-mode terminal, the GSM standard as well as the DECT standard.

According to another embodiment, the Home Database (HDB) can be in the form of a node with a Home Location Function (HLF) and a Service Control Function (SCF). This node is generally referred to as Service Data Point (SDP). Unlike the embodiment with HLR and INS, the functions of the HLR and INS in the Service Data Point (SDP) are performed by the Home Location Function (HLF) and the Service Control Function (SCF).

Examples of the architectures for implementing a Personal Communication Service (PCS) will be described hereinafter with reference to the drawings. Additional features and advantages of the invention are illustrated in the drawings.

DETAILED DESCRIPTION OF THE PRESENTLY PREFERRED EMBODIMENTS

Figure 1:
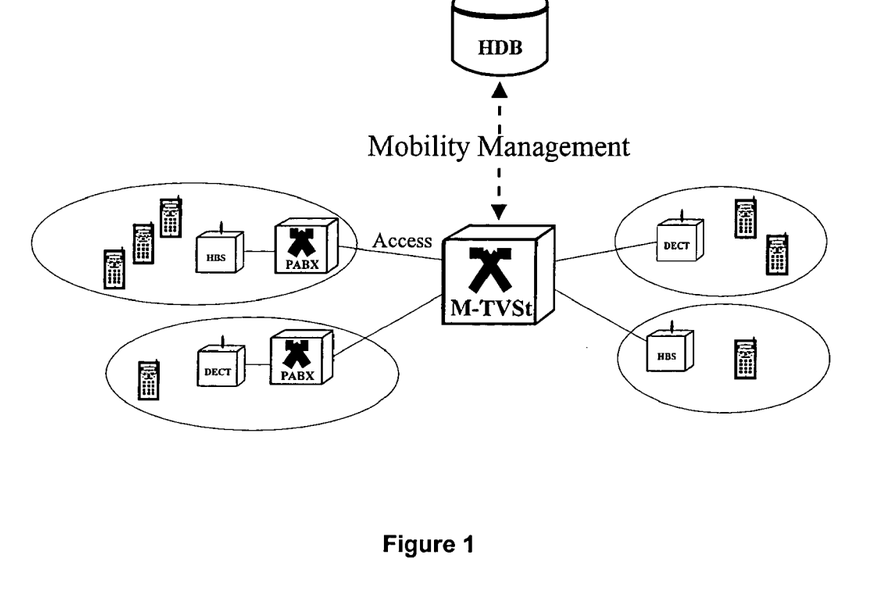
FIG. 1: is a general diagram of an arrangement according to the invention.

As illustrated in FIG. 1, all embodiments have common that for each subscriber the essential subscriber data are administered in a Home Database HDB. Depending on the implementation, the home database HDB consists of two separate nodes, namely an Intelligent Network Systems INS and the Home Location Register HLR of the mobile radio communication network (FIG. 2).

In an alternative embodiment (FIG. 5), the home database HDB may consist of a Service Data Point SDP with a Service Control Function SCF and a Home Location Function HLF. Relevant portions of the subscriber data are temporarily administered in the Visitor Database VDB of the respective local exchanges TVSt or (V)MSC of the subscriber. In the case of the Mobile Services Switching Centers (V)MSC, the VDB corresponds to the VLR. The terminals (as seen from the network) are connected in the local exchange TVSt through a D-Channel having additional mobility function. This extension will be referred to in the following as α-interface. The mobile radio communication terminal can be connected, for example, via a cordless base station DECT, wherein the terminal should support the GSM and the DECT standard. Alternatively, a GSM terminal can also be connected to the wireline network via a Home Base station HBS. It may also be possible to connect a Private Automatic Branch Exchange PABX between the local exchange TVSt and the DECT and HBS, respectively.

SEPARATE INTELLIGENT NETWORK SYSTEM AND HLR WITHOUT COUPLING

Figure 2:
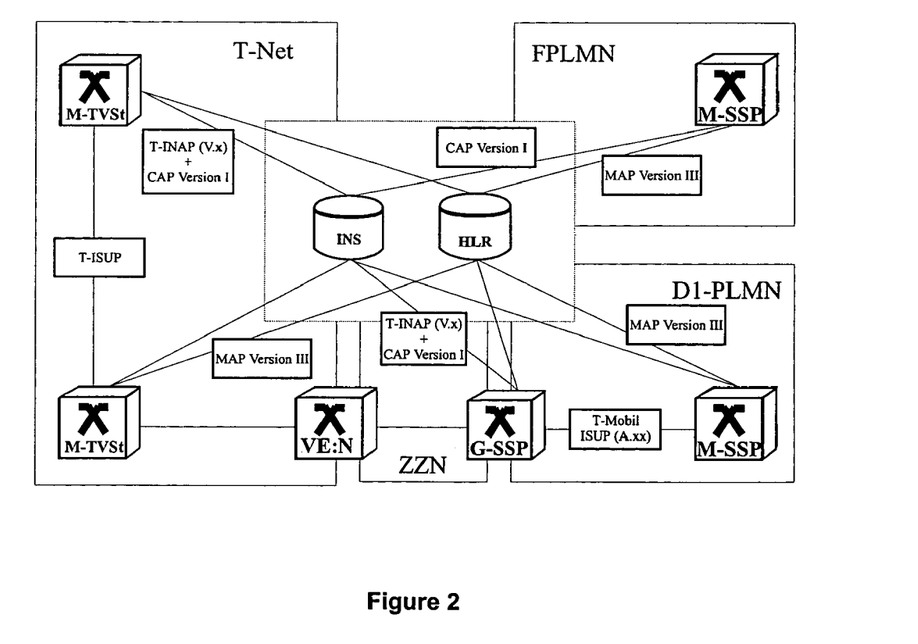
FIG. 2: is a schematic diagram of the first embodiment of the invention using a HLR and an INS as a Home Database.

In a first embodiment illustrated in FIG. 2, the home database HDB consists of an Intelligent Network System INS and a Home Location Register HLR. The nodes do not have to be coupled because they perform separate functions. The HLR is a central point for the mobility management and administers the subscriber profile for conventional ISDN/GSM services. Special services can be controlled through the INS. The required trigger points are optical components of the subscriber profiles.

A MAP implementation with interworking to the α-interface in the TVSt is necessary to convert the architecture.

The signaling data between the Intelligent Network System and the Home Location Register HLR and the mobile service switching points M-SSP as well as the wireline network local exchanges M-TVSt are transmitted through the MAP interface. The calls are connected and disconnected and the communication between the exchanges is executed via the ISUP.

The mobile radio telecommunication networks FPLMN and PLMN are connected to the wireline network T-Net through the gateway exchanges G-SSP and VE:N, respectively.

SUBSCRIPTION AND SUBSCRIBER-SPECIFIC DATA

Common Service Data

The object model for the subscriber profile in HLR and VDB/VLR has to be expanded in such a way that not only the existing GSM services, but also all existing ISDN services can be mapped. If possible, existing GSM objects should be re-utilized also for ISDN services. In so far as the GSM objects are not sufficient to map the ISDN service, the existing objects should be expanded and transmitted in the MAP as private extension. ISDN services, which do not exist in the GSM object model, can be added as network-specific services and transmitted in MAP. For this purpose, 16 services in the categories supplementary services, teleservices and bearer services are available.

Mobility Data

Services offering mobility require not only the aforementioned subscription for additional, tele and bearer services, but also a subscription for the mobility. To establish the Personal Communication Service PCS, the following options are required for the wireline and mobile radio segment. The optics for the two segments can be combined in any way.

WIRELINE NETWORK

1. No restrictions, i.e., the service is available to the subscriber at all terminals in the T-Net which are equipped for mobility.

2. Restricted to TVSt, i.e. the service is available to the subscriber at all terminals in the service region of one or several TVSt's which are equipped for mobility.

Limited to a terminal, i.e., the service is available to the subscriber at one or several terminals.

MOBILE RADIO COMMUNICATION NETWORK

1. No restrictions, i.e., the service is available to the subscriber in the entire service area of the T-Mobile (D1-Net and in the network of the roaming partners).
2. Only home network, i.e., the service is available to the subscriber only in the D1-Net.
3. Limited to certain regions, i.e., the services available to the subscriber only in specifically designated regions in the service area of T-Mobile (D1-Net and in the network of the roaming partners).

From mobile radio communication, the mobility options are implemented today through the functions in HLR and VLR. Two alternatives basically exist for the wireline network areas to implement the respective options:

1. Mobility profiles for the wireline network areas are not stored in HLR. Instead, a black list or white list of subscribers which are either not authorized and authorized, is administered for each terminal in the TVSt's.
2. Authorizations for individual terminals or individual TVSt's is administered in the HLR (black list or white list) and may be transmitted to the VDB/VLR. The Regional Subscription solution defined for the GSM standard may be used or expanded for this application.

The second alternative is preferred, since this approach minimizes the administrative complexity in the TVSt and therefore makes the service more quickly available to the subscriber.

HOME TERMINAL

In general, two types of dial numbers should be alternatively offered to the PCS subscriber:
1. Service dial number
2. Conventional dial number of the local exchange (local exchange dial number)

A home terminal need not be defined if a service dial number is used. Conversely, one home terminal per subscriber has to be installed if a local exchange dial number is used. With the local exchange dial number, the respective HLR address has to be administered in the respective TVSt for each subscriber.

IN-TRIGGER AND IN-SUBSCRIBER DATA

Services which may exceed the features of the GSM and ISDN services, may be offered to the subscribers optionally as subscriber-specific IN-services. The services require for control, for example, Initial Detection Points, Service Key and SCP-address (IN-trigger). The services which are relevant for incoming calls (PTC, PCS terminating call) and outgoing calls (POS, PCS originating call) have to be separated, because they require different IN-triggers.

The IN-trigger for POC are optionally components of the subscriber data in the HLR and VDB/VLR. The triggers are transmitted in the MAP. The same principle has to be applied also for the PCT-IN-trigger with PCS-subscribers having a service dial number. Two possibilities exist to supply the PCT-IN-triggers to PCS-subscribers having a local exchange dial number:

1. The PCT-IN-trigger is an optional component of the home terminal data and is administered subscriber-specific in the respective TVSt (in addition to the HLR address).
2. The PCT-IN-trigger is an optional component of the subscriber data in the HLR and VDB/VLR. The trigger is transmitted in the MAP.

The second alternative is preferred, since this approach minimizes the administrative expense in the TVSt and therefore speeds up and facilitates the availability of new IN-services to the subscriber.

In addition to the aforementioned IN-triggers, subscriber-specific IN-data are required in the SCP. However, this aspect will not be described in detail.

PROCEDURES FOR THE MOBILITY

In the following, the processes of the most important procedures for the PCS will be described. Procedures used in mobile radio communications will not be described further, since these are defined by the GSM standard and cannot be changed since they have to be compatible with other GSM networks operating outside the standards.

REGISTRATION (LOCATION UPDATE)

It is the object of the registration to transfer the required data of the subscriber profile from the HLR to the VDB/VLR and to provide the current location information in the HLR. Registration can basically be performed at any terminal equipped with the $\alpha$-interface. Restrictions for individual subscribers can be implemented through the subscriber profile.

The registration is triggered by the terminal. When requesting registration, the terminal identifies itself to the network with the IMSI or the TMSI. The process implemented in the GSM standard is used for authentication. Four different types of registration have to be distinguished:

1. Inscription Of A Terminal At A New Access In The Area Of A New VDB/VLR

In the case of mobile GSM stations, a need for a location update is recognized by comparing the location area stored in the SIM with the location area transmitted by the broadcast channel. A comparable function has to be developed for the $\alpha$-interface. Since in this case the subscriber is not registered with the VDB/VLR of the TVSt, the VDB/VLR extends the request to the HLR. The respective HLR is determined based on the IMSI (GIT according to ITU-T E.212). Depending on the selected alternative fro the mobility options in the wireline network, the validity of the requested registration is checked in the TVSt or in the HLR (for individual terminals after transmission of the profile in the VDB/VLR). The E.164 number of the TVSt is transmitted to the HLR as a MSC and VLR number. Before the registration is completed, the required subscriber profile is transmitted to the VDB/VLR. The VDB/VLR stores the actual terminal of the subscriber.

2. Inscription Of A Terminal At A New Access In The Area Of The Old VDB/VLR

As discussed above with respect to item 1.), the terminal recognizes that a new registration is required.

Since in this case the subscriber is already registered with the VDB/VLR, the registration is carried out without participation of the HLR. Based on the permanently stored data or the data contained in the dynamic profiled, the validity of the registration requested for this terminal is checked in the VDB/VLR. The VDB/VLR stores the actual new terminal of the subscriber.

3. Inscription Of The Terminal At The Old Access After IMSI-Detach

The ATT-flag in the VDB/VLR is set to attached.

4. After Expiration Of The Periodic Location Update Timer In The Terminal

After expiration of a periodic location update timer in GSM terminals, a periodic registration is initiated as a precautionary measure. The starting value of the timer is transmitted via the broadcast channel. The timer is restated after each communication between the network and the terminal. This procedure is an essential component of the Implicit Detach Procedure of the VDB/VLR (the subscriber is automatically detached when a subscriber-specific timer in the VDB/VLR expires, and the timer is restarted after each communication between the network and the terminal). In addition, this procedure is used to eliminate inconsistencies of files.

Accordingly, a comparable function has to be developed also for the α-interface.

Depending on the data of the VDB/VLR, the periodic registration causes the actions described on the items 1.) to 3.) above.

After the registration has been successfully completed, the subscriber, i.e., the IMSI, is temporarily assigned to the physical terminal. It is possible to assign several subscribers simultaneously to a physical terminal.

PCS ORIGINATING CALL (POC)

A PCS originating call (POC) is triggered by the terminal through a corresponding request (setup) via the α-interface. The terminal identified itself with respect to the network with the IMSI or the TMSI. The process used with the GSM standard is also used for authentication.

The VDB/VLR checks the validity of the requested call (subscription of the tele-services, ODB blocking, barring settings, and the like). If necessary, the call is rejected with a respective cause or rerouted to the operator at the ODB.

After successful completion of the check in the VDB/VLR, the requested call is set up. The dial number (basic MSISDN) of the calling party (local exchange number or service number) stored in the VDB/VLR is inserted as the CallingPartyNumber. The LocationNumber is set up depending on the terminal.

If an IN-MOC trigger (optional) is set in the VDB/VLR, then an IN-dialog is initiated to the respective service control point SCP). The SCP address (E.164 number) and the ServiceKey are part of the IN-trigger.

PCS TERMINATING CALL (PTC)

Figure 3:
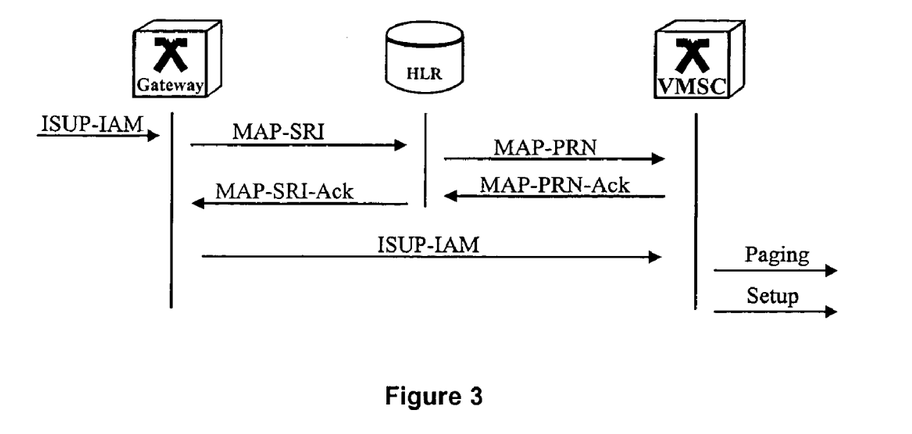
FIG. 3: shows interrogation of the HLR when a call is received.

As illustrated in FIG. 3, for setting up a PCS Terminating Call (PTC), a MAP interrogation to the HLR (extended to the VDB/VLR) is required. For subscribers having a local exchange dial number, this interrogation is started by the TVSt at the home terminal (Gateway). The respective HLR is interrogated based on the HLR number (E.164 number) associatively stored with the dial number.

For subscribers having a service number, the interrogation can be carried out in any VSt or MSCen (Gateway). The numbers are uniquely associated with the respective HLR based on the service number (for example, based on the first for numbers after the NDC). All available service data are transmitted with the interrogation to the HLR. The HLR checks the validity of the requested calls (subscription of tele-services, ODB blocking, Barring settings and the like). If necessary, the call is rejected with the respective cause. The interrogation to the current VDB/VLR is continued after a successful check in the HLR (only if call forwarding unconditional is not activated).

The VDB/VLR checks the attach-status of the subscriber (IMSI) and responds to the interrogation with a temporary dial number selected from the service area of the TVSt (mobile station roaming number, MSRN) or the corresponding cause (absent subscriber). The MSRN is transmitted from the HLR to the gateway. In the event of an absent subscriber, Call Forwarding (if activated) Not Reachable is activated in the HLR.

In the gateway, the MSRN is used for setting up the call to the actual TVSt. As soon as the call reaches the actual TVSt, the call is correlated with the called subscriber (IMSI) based on the MSRN. The current physical terminal is contained in VDB/VLR data, a procedure similar to GSA paging is triggered via the α-interface, and the call set up is subsequently terminated. The terminal is called from the network using the IMSI or the TMSI. The process used with the GSM standard is used for authentication.

Figure 4:
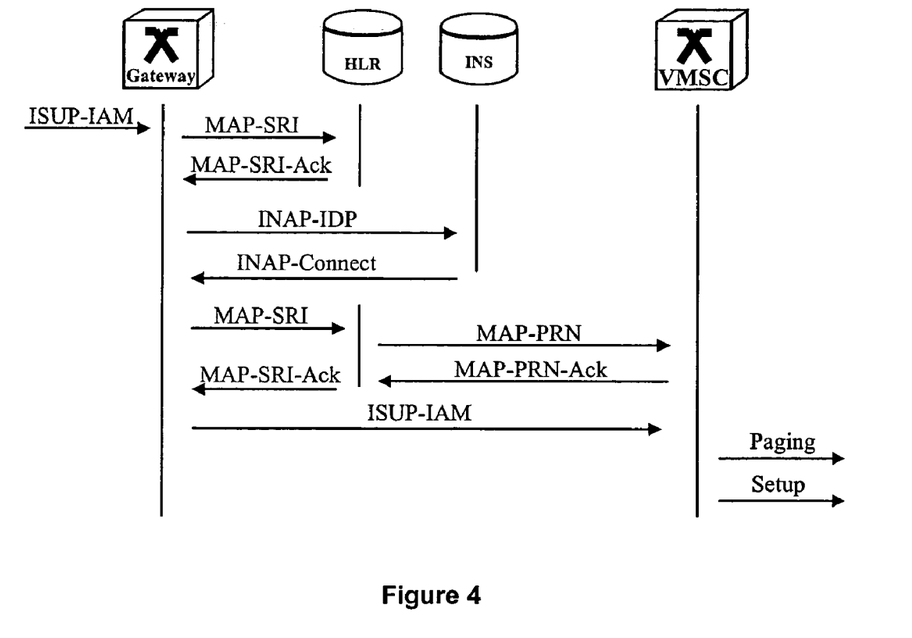
FIG. 4: shows interrogation of the HLR and INS for an incoming call.

If an optional IN-MTC-trigger is set in the HLR, then the interrogation is initially not continued to the VLR, as shown in FIG. 4. Instead, the IN-trigger is returned to the gateway, and an IN dialog to the respective Service Control Point (SCP) of the INS is initiated. The SCP address (E.164 number) and the ServiceKey are part of the IN trigger. After completion of the IN dialog (unless the IN dialog requests that the connection setup continues), a new interrogation is initiated to the HLR and on to the VLR.

CONTROL OF SUPPLEMENTARY SERVICES

ISDN and GSM supplementary services are controlled by the functional protocol between the terminal and the HLR.

The control of additional services (non-ISDN and non-GSM supplementary services, respectively) in the INS is still open, but may be implemented, for example, via an IN-IP or via the Internet.

SCF AND HLF IN A NODE, VARIANT INAP AND MAP IN A WIRELINE NETWORK

Figure 5:
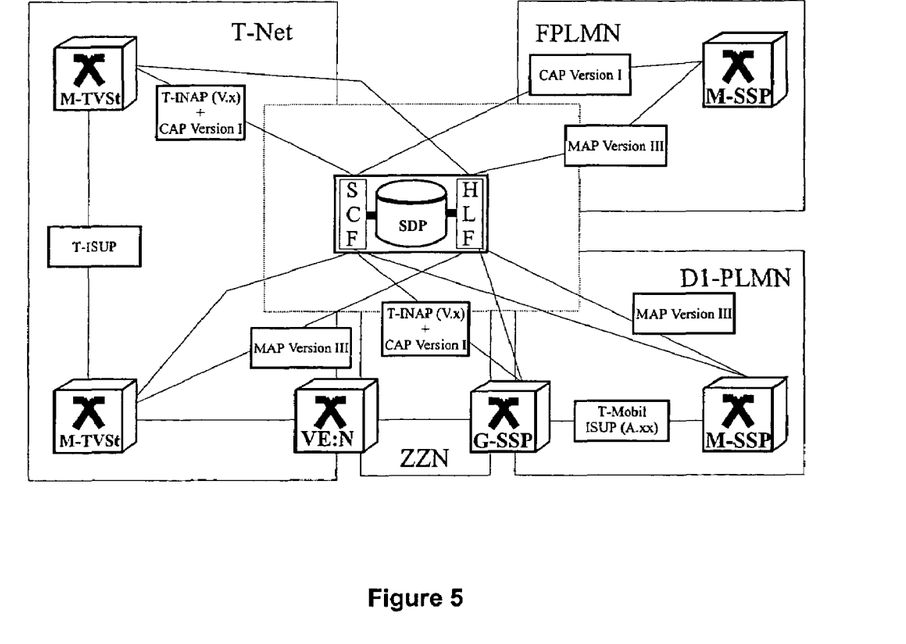
FIG. 5: is a schematic diagram of an other embodiment of the invention using an SDP as a Home Database.

In the architecture illustrated in FIG. 5, the Home Database HDB consists of a Service Data Point SDP with Service Control Function (SCF) and Home Location Function (HLF). Both functions access a common database. The HLF is a central point for the mobility management and manages the subscriber profile for traditional ISDN/GSM services. Special services can be controlled by the SCF. The required trigger points are optional components of the subscriber profile.

The architecture can be implemented with MAP in conjunction with interworking to the α-interface in the TVSt's. Further development of the HDB is also required. The exchange is here also connected using the MAP protocol.

The object model for the subscriber profile in the database (SDP, Service Data Point) has to be designed so that both the GSM services as well as all ISDN services can be mapped. If possible, existing GSM objects should also be reused for ISDN services. If the GSM objects are not sufficient to map the ISDN service, then the existing objects should be expanded and transmitted as private extension in the MAP. ISDN services which are not included in the GSM object model, could be inserted as network specific services and transmitted in the MAP. Available are here at least 16 services for the categories supplementary services, teleservices and bearer services.

MOBILITY DATA

Services offering mobility require both the aforementioned subscription for additional, tele- and bearer services as well as a subscription for mobility. To implement the PCS, the following options are required for the wireline network segment and the mobile radio communication network segment. The options of the two segments can be combined in any way.

WIRELINE NETWORK

1. No restrictions, i.e., the service is available through the subscriber at all terminals in the T-Net equipped for mobility.
2. Restricted to TVSt, i.e., the service is available to the subscriber at all terminals in one or several TVSt's equipped for mobility.
3. Limited to a terminal, i.e., the service is available to the subscriber at one or several terminals.

MOBILE RADIO COMMUNICATION NETWORK

1. No restrictions, i.e., the service is available to the subscriber in the entire service region of the T-mobile (D1-Net and in the networks of all roaming partners).
2. Only home network, i.e., the service is available to the subscriber only in the D1-Net.
3. Regionally limited, i.e., the service is available to the subscriber only in specifically allowed regions in the service areas of the T-mobile (D1-Net and in the networks of the roaming partners).

For the mobile radio communication segment, the mobility options are already implemented today through the functions in the HLR and the VLR. Two alternatives exist in the wireline network to implement the respective options:

1. No mobility profiles for the wireline network segment are stored in the HLR. Instead, a black list or white list of the subscribers who are not authorized or who are authorized, respectively, is administered in the TVSt's for each terminal.
2. Access for the individual terminals or individual TVSt's is managed in the HLR (black list or white list) and transmitted to the VDB/VLR if requested. The Regional Subscription solution defined for the GSM standard can also be used or expanded for this application.

The second alternative is preferred, since this minimizes the administrative complexity in the TVSt and thereby speeds up the availability of the service to the subscriber.

HOME TERMINAL

Two types of dial numbers are advantageously alternatively provided to the PCS subscriber:
1 Service dial number
2. Conventional dial number of a local exchange network (local exchange number).

A home terminal does not have to be specified if a service dial number is used. Conversely, if a local exchange number is used, a home terminal has to be set up for each subscriber. The respective SCF address has to be managed administratively in the respective TVSt specific for each subscriber.

IN-TRIGGER AND IN-SUBSCRIBER DATA

Service which may be in addition to the features of the GSM and ISDN services, can be offered to the subscribers optionally as subscriber-specific IN-services. The services require for control, for example, Initial Detection Points, Service Key and SCP-address (IN-trigger). The services which are relevant for incoming calls (PTC, PCS terminating call) have to be distinguished from those for outgoing calls (POC, PCS originating call); only explicit POC-IN-triggers are required due to the integrated HDB architecture.

The IN-trigger for POC are optional components of the subscriber data in the HDB and VDB/VLR. The triggers are transmitted in the MAP.

In the case of PTC, it can be determined in the HDB, if IN-processing is requested which can be locally implemented, if desired.

In addition to the aforementioned IN-triggers, subscriber specific IN-data are required in the database. However, this space will not be described here in detail.

PROCEDURES FOR THE MOBILITY

In the following, the process flow of the most important procedures for the PCS will be described. Procedures relating to mobile radio communications will not be described further, since these are defined by the GSM standard and cannot be changed due to the required compatibility with other GSM networks operating outside the standards.

REGISTRATION (LOCATION UPDATE)

It is the object of the registration to transfer the required data of the subscriber profile from the HDB to the VDB/VLR and to provide the current location information in the HDB. Registration can basically be performed at any terminal equipped with the á-interface. Restrictions for individual subscribers can be implemented through the subscriber profile.

The registration is initiated by the terminal. When requesting registration, the terminal identifies itself to the network with the IMSI or the TMSI. The process implemented in the GSM standard is used for authentication. Four different types of registration have to be distinguished.

1. Inscription Of A Terminal At a New Access In the Area of A New VDB/VLR

In the case of mobile GSM stations, a need for a location update is recognized by comparing the location area stored in the SIM with the location area transmitted by the broadcast channel. A comparable function has to be developed for the α-interface.

Since in this case the subscribers are not registered with the VDB/VLR of the TVSt, the VDB/VLR extends the request to the HLF. The responsible HDB is determined based on the IMSI (GTT according to ITU-T E.212). Depending on the alternative selected for the mobility options in the wireline network, the validity of the requested registration is checked in the TVSt or in the HDB (or individual terminals in the VDB/VLR after transmission of the profile). The E.164 number of the TVSt is transmitted to the HDB as a MSC and VLR number. Before the registration is completed, the required subscriber profile is transmitted to the VDB/VLR. The VDB/VLR stores the actual terminal of the subscriber.

2. Inscription of A Terminal At a New Access in the Area of The Old VDB/VLR

As discussed above with respect to item 1.), the terminal recognizes the need for a new registration.

Since in this case the subscriber is already registered with the VDB/VLR, the registration is carried out without participation of the HDB. Based on the permanently stored data or the data contained in the dynamic profiled, the validity of the requested registration for this terminal is checked in the VDB/VLR. The VDB/VLR stores the actual new terminal of the subscriber.

3. Registration Of The Terminal At the Old Access After IMSI-Detach

The ATT-flag in the VDB/VLR is set to attached.

4. After Expiration Of The Periodic Location Update Timer In The Terminal

After expiration of the Periodic Location Update Timer in GSM terminals, a periodic registration is initiated as a precautionary measure. The starting value of the timer is transmitted via the broadcast channel. The time is restarted after each communication between the network and the terminal. This procedure is an essential component of the Implicit Detach Procedure of the VDB/VLR (the subscriber is automatically detached when a subscriber-specific timer in the VDB/VLR expires, and the timer is restarted after each communication between the network and the terminal). In addition, this procedure is used to eliminate inconsistencies in the files. Accordingly, a comparable function has to be developed also for the α- interface.

Depending on the data status of the VDB/VLR, the periodic registration causes the actions described on the items 1.) to 3.) above.

After the registration has been successfully completed, the subscriber, i.e., the IMSI, is temporarily assigned to the physical terminal. It is possible to assign several subscribers simultaneously to a physical terminal.

PCO ORIGINATING CALL (POC)

A PCS originating call (POC) is initiated by the terminal through a corresponding request (setup) via the α- interface. The terminal identifies itself with respect to the network with the IMSI or the TMSI. The process used with the GSM standard is used for authentication.

The VDB/VLR checks if the requested call (subscription of tele-services, ODB blocking, barring settings, and the like) is permitted. If necessary, the call is rejected with a respective cause or rerouted to the operator for an ODB.

After successful completion of the check in the VDB/VLR, the requested call is set up.

The dial number (basic MSISDN) of the calling party (local exchange number or service number) stored in the VDB/VLR is inserted as the CallingPartyNumber. The LocationNumber is set up depending on the terminal.

If an IN-MOC-trigger (optional) is set in the VDB/VLR, then an IN-dialog is initiated to the respective service control point (SCP). The SCP address (E.164 number) and the ServiceKey are part of the IN-trigger.

PCR TERMINATING CALL (PTC)

Figure 6:
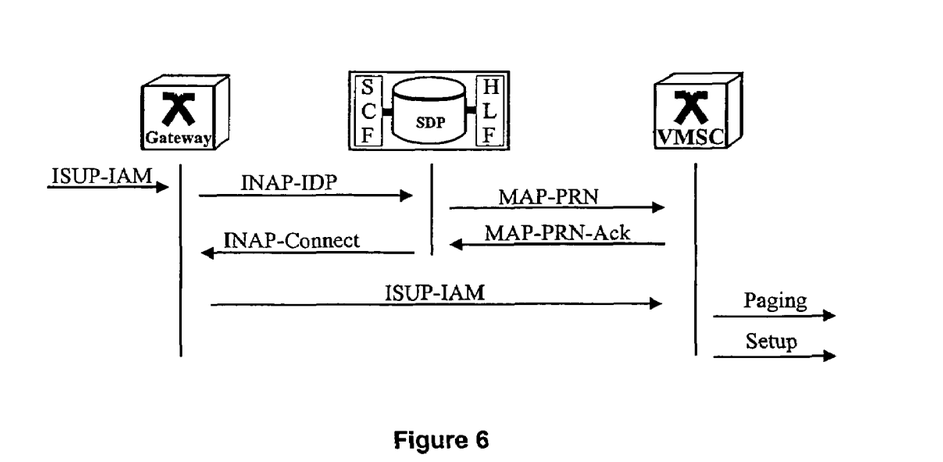
FIG. 6: shows interrogation of the SDP for an incoming call.

As illustrated in FIG. 6, setting up a PCS terminating call (PTC) requires an INAP interrogation to the SCF of the HDB. This INAP-dialog replaces the MAP dialog which is typically used with GSM at the C-interface. For the subscriber having a local exchange dial number, this interrogation is started by the TVSt of the home gateway. The respective HDB is interrogated based on the SCF number (E.-164 number) associatively stored with the dial number.

For subscribers having a service number, the interrogation can be carried out in any VSt or MSCen (Gateway). The numbers are uniquely associated with the respective HDB based on the service number (for example, based on the first for numbers after the NDC). All available service data are transmitted with the interrogation to the HDB. The HDB checks the validity of the requested call (subscription of the tele-service, ODB blocking, Barring settings and the like) are permitted. If necessary, the call is rejected with the respective cause.

If an optional IN-MTC-trigger is set in the database, then the interrogation is initially not continued to the VLR. Instead, IN-processing in the SCF is started. After the conclusion of the IN dialog (unless the IN dialog requires that the set-up of the connection is continued), the interrogation is continued in the HLF, i.e., the interrogation is continued to the actual VDB/VLR.

The VDB/VLR checks the attach status of the subscriber (IMSI) and responds to the interrogation with a temporary dial number from the service region of the TVSt (mobile station roaming number, MSRN) or the corresponding cause (absent subscriber). The MSRN is transmitted from the HDB to the gateway. Call Forwarding Not Reachable (if activated) is triggered in the HDB if the subscriber is absent.

In the gateway, the MSRN is used for setting up the call to the actual TVSt. As soon as the call reaches the actual the TVSt, the call is correlated with the called subscriber (IMSI) based on the MSRN. The current physical terminal is contained in VDB/VLR data files, a procedure similar to GSA paging is triggered via the á-interface, and set up of the call is subsequently terminated. The terminal is called from the network using the IMSI or the TMSI. The process used with the GSM standard is used for authentication.

CONTROL OF SUPPLEMENTARY SERVICES

ISDN and GSM supplementary services are controlled by the functional protocol between the terminal and the HLR.

The control of additional services (non-ISDN and non-GSM supplementary services, respectively) in the INS is still open, but may be implemented, for example, via an IN-IP or via the Internet.

SEPARATE INTELLIGENT NETWORK SYSTEM WITH COUPLING TO THE HLR

Figure 7:
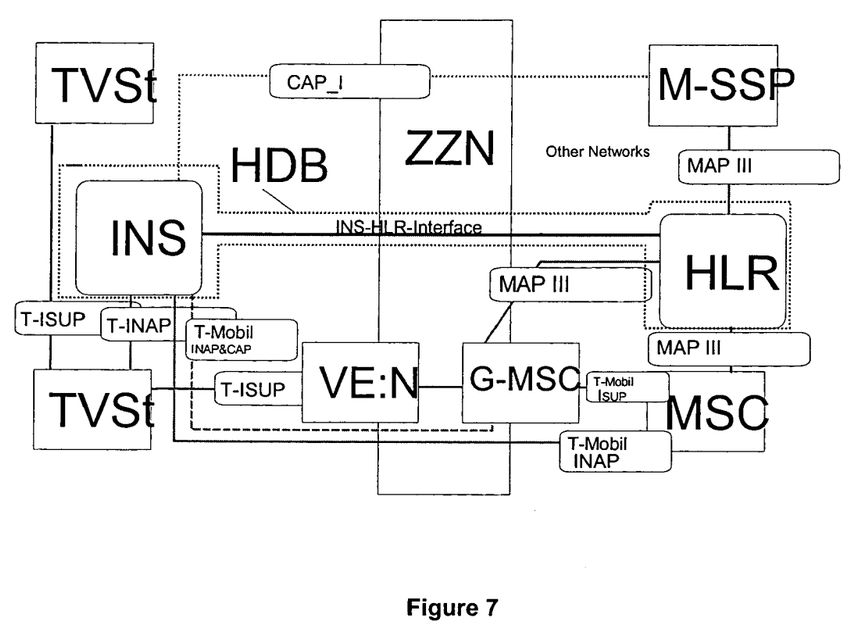
FIG. 7: is a schematic diagram of a third embodiment of the invention with coupling between the INS and the HLR.

Referring now to FIG. 7, the Home Database (HDB) in this configuration consists of an Intelligent Network System and a GSM-HLR which are coupled to each other via an initially proprietary open interface. This approach was selected in order to take into account two particular aspects:

The first step described herein for providing a technical platform combining services should be a development towards the target configuration. The proposed target is based on an HDB/VDB concept and on the models of the Intelligent Network Standards of the Capability Set 2 and 3.

The convergence of the service profiles and the integration of the service profiles from TVSt, HLR and SCP/SMP is one of the essential goals of the product development. The models described herein allow an early and consistent implementation of this goal.

The present configuration provides that the INS take over the entire communication to the exchanges of the base network (initially only TVSt, but thereafter also the MSC functions of the proprietary network), thereby operating as a focal point for the service management and mobility management. The HRL assumes the adaptation to the GSM interface (MAP). Changes in the service profile data of the subscriber are transmitted via the HLR to the INS which sends an acknowledgement. The GSM data are mapped in the INS.

Figure 8:
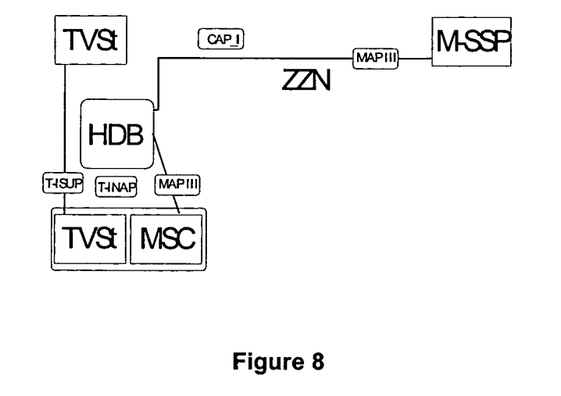
FIG. 8: shows the integration of the INS and HLR to a Home Database HDB in a node.

For configuration reasons, the INS is located in the wireline network, whereas the HLR is initially located—for sake of simplicity—in the mobile radio communication network. The INAP is routed across the network boundary, the SCP function is located in the wireline network. The configuration can be subsequently expanded to a convergent wireline network by integrating the INS and HLR, and the TVSt and MSC, respectively, which requires only small changes. This basic structure is illustrated in FIG. 8.

For special services, control can be implemented through an INS on the mobile radio communication side, whereas the PCS-subscriber-data are mapped completely on the HDB structure. The trigger points for initiating the INS from the mobile radio communication side are optional components of the GSM subscriber profile, whereas the trigger points in the T-Net are located in the TVSt. (A "Home-TVSt" which contains the relevant trigger points, is always associated with a respective E.164 number). Implementation of the architecture requires an expansion of the INAP to include certain MAP functions. (MAP functions for location updates and setup of the incoming connection).

Interworking between INAP and the α- interface is provided for access of subscribers with mobility functions from the T-Net access.

SUBSCRIPTION AND SUBSCRIBER-SPECIFIC DATA

General Service Data

One major goal for improving the PCS features in a convergence of the service profiles. This means in particular that the service profile of a subscriber is not, as today, stored in up to three different databases (TVSt, SCP/SDP and HLR), which are not correlated with each other, but rather combined at a single location. This concerns, on one hand, the input and change of data of the service profile (e.g., the destination of call forwarding, blocked destination, etc.) and, on the other hand, the actual processing of a service feature. The aspect mentioned first, storage and change of subscriber data, should be entirely integrated in the INS.

Figure 9:
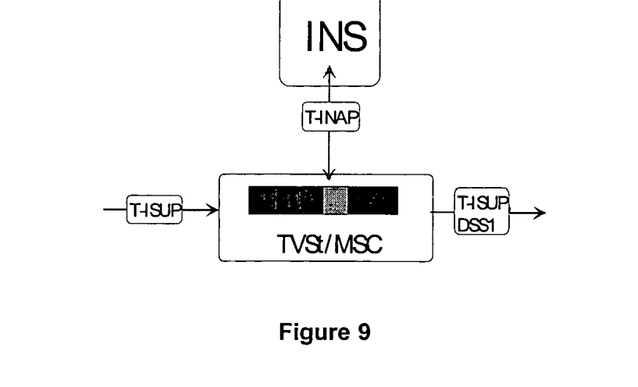
FIG. 9: shows processing of the connection in the exchanges with the help of the INS.

To actually implement the services, service features and IN-functions, it has to be specified where the implementation takes place. Two extreme situations may occur: On the basis of very comprehensive data which are loaded into the VDB function, the connection can be processed—at least to a considerable extent—in the TVSt/MSC without starting an IN interrogation in the actual situation. The IN only contributes particular information which is incorporated into the messages and parameter for further call processing. As known from the "conventional" IN, the INS here takes on the role of an "additional control", whereas the actual call control function is located in the TVSt/MSC. This situation is illustrated in FIG. 9. The data received in the TVSt/MSC are stored, processed and forwarded at that respective location. The INS effects the process by changing particular information.

Figure 10:
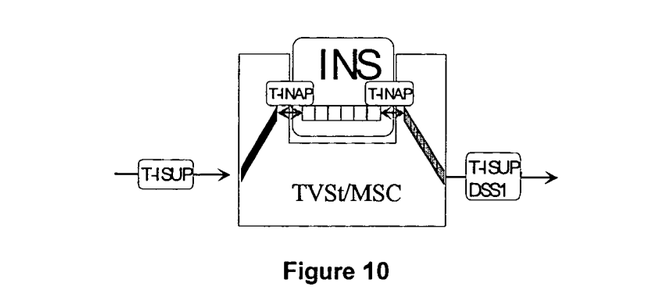
FIG. 10: shows processing of the connection in the exchanges by directly incorporating INS.

In the second case, which is illustrated in FIG. 10, the INS is included much more strongly in the processing aspect of the connection than in the first case. All information content is composed by the INS, and only the changed or unchanged messages produced by the INS are routed onward.

The second aforedescribed situation is in better synergy with the objectives since processing of the services, service characteristics and IN functions is combined in the HDB.

This makes it possible, on one hand, to process the interaction of services and service characteristics without undue complexity and, on the other hand, allows the subscriber to review the status of the service characteristics. (Example: newly inputted forwarding destinations override the previously entered destinations, independent of the access from which the service characteristics is controlled. The subscriber need no longer be aware that the forwarding destinations may exist independently from each other on different platforms).

Since the goal is to establish service profile for a subscriber, the subscriber profile in the INS has to be able to map all existing (and future) ISDN and GSM services.

To attain mobility across networks, it is essential to provide mobility also to the service profile of a subscriber. This is illustrated schematically in FIG. 11. The service profile of a mobile subscriber has to ba available in any TVSt at any time the subscriber resides in the service area of a TVSt.

Figure 11:
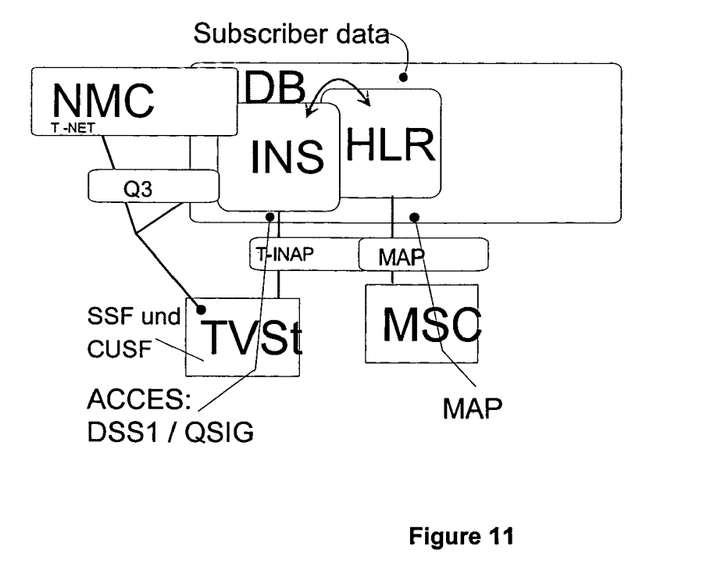
FIG. 11: is schematic flow diagram of the setup and change of subscriber data in a network node.

The object models for setting up and changing subscriber data in the network nodes (According to TMN) are obtained as completely as possible from existing implementations (Q3 interfaces at the TVSt and the MSC), with the service profile initially located in the INS. When the subscriber inscribes in a certain TVSt, the profile is loaded to that TVSt. (Visitor Database, VDB function in the TVSt). The required data structures should resemble as much as as possible the object models for the Q3 interface, and the "application transport mechanism (APM)" which is now available as SP-1 standard, should be used as a transport mechanism. This mechanism is also the basis for the transport of the information between the CUSF Call Unrelated Service Function) and the SCF. The CUSF (IN, CS2) is employed in addition to the SSF in the TVSt to "extend" the connection line protocols for controlling the service characteristics (functional, keypad, analog) from the TVSt to the SCF.

The ISDN or GSM service profiles should be matched to each other—in the sense of a uniform service profile. The protocols and data structures necessary for controlling the services and changing the subscriber data from the access can be substantially adapted form the ISDN D-channel or the GSM MAP. The goal is an open protocol structure according to the future DSS1+ standard, since only in this way can the converging development of private and public networks to be accommodated.

Protocols based on the generic functional protocol can be ported to the TCAP. A first example is the VPN standard established in the SPS5. The object model for the subscriber profile in HDB has to be adapted with respect to the GSM network components, so that all existing GSM objects can still be used. In particular, those data which are loaded into the GSM-VLR through the MAP should remain unchanged.

MOBILITY DATA

Services offering mobility require, aside from the aforementioned subscriptions to supplementary, bearer and teleservices, also a subscription to the mobility feature. To be able to scale the PSC offer, the following options are required for the T-Net as well as for the T-Mobile network. These options should be combinable in an arbitrary manner.

T-NET

No restrictions, i.e., the mobility features is available to the subscriber at all terminals in the T-Net where mobility functions are activated.
Limited to a service region of a TVSt, i.e., the feature mobility is available to the subscriber at all terminals of one or several TVSt's in the T-Net where mobility functions are activated.
Limited to a terminal (terminal in the sense of base connection, PMX connection), i.e., the feature mobility is available to the subscriber at one or several predetermined terminals in the T-Net where mobility functions are activated.
Other profiles can be implemented easily with the IN base used in this concept.

T-MOBILENET

No restrictions, i.e., the mobility feature is available to the subscriber in the entire service area of T-Mobile.
Limited to the service area of the home network, i.e., the mobility feature is available to the subscriber only in the D1-Net.
Regionally limited, i.e., the mobility feature is available to subscriber only in an specifically allowed region in the service area of T-Mobile.
As soon as the mobility functions are available from each T-Net terminal, the aforementioned (and also other) mobility options can be easily implemented in the T-Net-HDB using the means of the IN. The aforedescribed mobility options are already implemented in the mobile radio communication segment through functions in the HLR and VLR. It would be desirable to convert these features by using the possibilities of the IN (in the sense of a uniform service profile).

HOME TERMINAL

In general, two types of dial numbers should be offered to a PCS subscriber in the alternative
1. A dial number selected from service dial numbers (excluding 0171) or
2. A dial number selected from local exchange dial numbers.
When using a service dial number, the association of all subscribers with their respective IN SCP functions must be known and actually available in each network node (or in a defined subset thereof). The routing for service dial numbers is implemented in all VSt independent of the PCS. When using local exchange dial numbers (ONKZ), the setup of the trigger and SCP association data can be limited to a selected TVSt (home TVSt).

IN-TRIGGER AND IN-SUBSCRIBER DATA

The existing services mapped in the IN from the GSM and ISDN areas can be expanded by providing additional services enabled by the IN. The (originating/terminating) Detection Points provided in the IN implementations can be employed. Scenarios for incoming calls (PTC, PCS terminating call) have to be distinguished from those for outgoing calls (POC, PCS originating call), since these require different IN triggers. In the case of GSM, the IN trigger detection points for PCS subscribers should be administered as a component of the subscriber data in the HDB and transmitted via the HLR function through the MAP (Service Key) to the respective MSC. Two solutions are conceivable for processing connections in the ISDN T-Net structure,:

The detection points are kept as data in the HDB and transferred to the TVSt when an incoming connection is set up. This requires that an IN interrogation is performed for each connection (also for non-PCS connections). For setting up outgoing connections, the trigger tables have to be loaded into the VDB.
Consequently, the concept of a "home"-TVSt, where the corresponding triggers for incoming connections are activated, appears to be a less complex approach. The trigger points for outgoing connections have to be activated, as in the first case, in the respective current (visited) TVSt when the subscriber profile is loaded (see above).

PROCEDURES FOR MOBILITY

In the following, the most important procedures for the PCS will be described. Procedures relating to mobile radio communication will not be described, since these are defined by the GSM standard and cannot be changed due to the required compatibility with other GSM networks operating outside the standards.

REGISTRATION (LOCATION UPDATE)

It is the object of the registration to transfer the required data of the subscriber profile from the HDB to the VDB/VLR and to provide the current location information in the HDB. Registration can basically be carried out at any terminal equipped with the á-interface. Restrictions for individual subscribers can be implemented through the subscriber profile.

The registration is initiated by the terminal. When requiring registration, the terminal identifies itself to the network with the IMSI or the TMSI. The process implemented in the GSM standard is used for authentication.

After successful registration, the subscriber is temporarily assigned, i.e., the IMSI is correlated with the physical terminal. In general, several subscribers can be associated with a physical terminal at the same time.

A distinction has to be made between four different types of registration:

Inscription Of A Terminal At A New Access In The Area Of A New VDB/VLR

In the case of mobile GSM stations, a need for a location update is recognized by comparing the location area stored in the SIM with the location area transmitted by the broadcast channel. Since the SIM should preferably also be used within the wireline network, the concept of the location area has to be expanded for the T-Net application. Compatibility with the GSM procedures has to be assured, since the two procedures are not used in the alternative, but with one another. GSM location areas stored in the SIM have to be understood and location areas from the wireline network have to be stored in the SIM, which do not lead to incompatabilities in the GSM components. The α-interface has to support a corresponding function.

The location update is extended from the VAB/VAR, of the TEST to the INS/HER. The correct INS is determined based on the IMSI.

The validity of the request registration is checked in the INS/HER. A TEST/VAB code in the form of an E.164 number or a MSC and VAR number in the E.164 format is transmitted to the INS. Before the registration is completed, the required subscriber profile is transmitted to the VAB/VAR (see above). The VAB/VAR stores the actual terminal of the subscriber.

Registration Of The Terminal At The Old Access After IMSI-Detach

The ATT-flag in the VDB/VLR is set to attached.

After expiration of a Periodic Location Update Timer in PCS terminals, a periodic registration is initiated as a precautionary measure. The subscriber is automatically detached from this location when a subscriber-specific timer expires in the VDB/VLR. The starting value of the time is defined within the framework of the communication between the terminal and the VDB through the α-interface. The timer is restarted after each communication between the network and the terminal. The Periodic Location Update Procedure proceeds according to the aforedescribed procedure.

This procedure is an essential component of the Implicit Detach Procedure of the VDB/VLR. In addition, this procedure is used to eliminate inconsistencies in the files. Accordingly, the Periodic Location Update Procedure has to be developed also based on the α-interface.

PCS ORIGINATING CALL (POC)

A PCS Originating Call (POC) is triggered by the terminal by transmitting a setup message in the D-channel. The terminal identifies itself with respect to the network with the IMSI or the TMSI. The process used with the GSM standard is used for authentication.

The VDB/VLR checks the validity of the requested call (access to services, service features, blocking, barring settings, and the like). If necessary, the call is rejected with a respective cause or rerouted to the operator. After successful completion of the check in the VDB/VLR, the requested call is set up and previously activated TDP's are processed, if necessary. The dial number (basic MSISDN) of the calling party (local exchange number or service number) stored in the VDB/VLR is inserted as the CallingPartyNumber, if no other CallingPartyNumber is set by the SCP. The Location-Number is set up depending on the terminal. The SCP address and the ServiceKey are a part of the IN trigger table.

PCS TERMINATING CALL (PTC)

For a PCS terminating call (PTC) to a dial number formatted as a local exchange dial number, a TDP is typically activated in the home TVSt of the PCS subscriber which results in an interrogation in the HDB. An INS interrogation is also initiated for incoming connections to a service number. The respective INS is interrogated based on the INS address (E.164 number format) stored in the trigger table.

For subscribers with a service number, an IN interrogation can be carried out in any network node of (initially only) the respective network. The numbers should be uniquely associated with the responsible INS based on the service number.

All available service data are transmitted from the TVSt to the INS with the IN interrogation. For a dial number formatted as a local exchange number, the attach status of the subscriber (IMSI) in the IDP is transmitted to the SCP. The SCP checks the validity of the requested connection. If necessary, the connection is refused with a respective cause.

After a successful check in the SCP, the following processes are carried out depending on the dial number structure employed:

The connection is processed using the control information received by the SCP (dial number in the format of a local exchange number) or For a service dial number (request from an arbitrary node in the network), the attach status of the subscriber (IMSI) is initially checked by the SCP in the VDB/VLR. The VDB/VLR responds to the SCP request with a temporary dial number selected from the service area of the TVSt (mobile station roaming number, MSRN) or the corresponding cause (absent subscriber). The MSRN is transmitted to the network node which submitted the request.

The MSRN is used in the network known for setting up the call to the actual TVSt (or the connection is further processed with the control information received from the SCP). When the call reaches the actual TVSt, the call is correlated with the called subscriber (IMSI) based on the MSRN. The actual physical terminal with which the connection is to be set up, is contained in VDB/VLR data. The terminal is called from the network using the corresponding IMSI or the TMSI. Paging of the terminal is controlled directly from the T-Net. The process used with the GSM standard is used for authentication.

CONTROL SERVICE FEATURES

For the control of the ISDN and GSM supplementary services, see first embodiment under General Service Data.

ACCESS TO THE PCS BOX

Storing New Messages

The messages are controlled by the SCP and routed to the PCS box.

Messaging The PCS Box

Messaging is performed via the SMS to the GSM terminals and message waiting indication corresponding to the ETSI standards relating to ISDN terminals.

Interrogating The PCS Box

The PCS box is interrogated from the T-Net and from the mobile network using the features offered by authentication via SIM. A PIN is no longer required.

NUMBERING & ROUTING

The number parameters of the GSM also employed in the T-Net. A distinction in the used numbers has to be made between subscriber-specific parameters (IMSI, MSISDN, MSRN, Access-ID, MSN) and network node-specific parameters (HDB (SCP/HRL) addresses in the E.164 format, VDB address in the E.164 format, TVSt address in the E.164 format).

INTERWORKING BETWEEN TERMINAL AND NETWORK PROTOCOLS has already been described above.

PROVIDING ACCOUNTING DATA

Accounting data have to be associated with the ID, and not with the network addresses.

SCF AND HLF IN A NODE, VARIANT INAP IN A WIRELINE NETWORK

Figure 12:
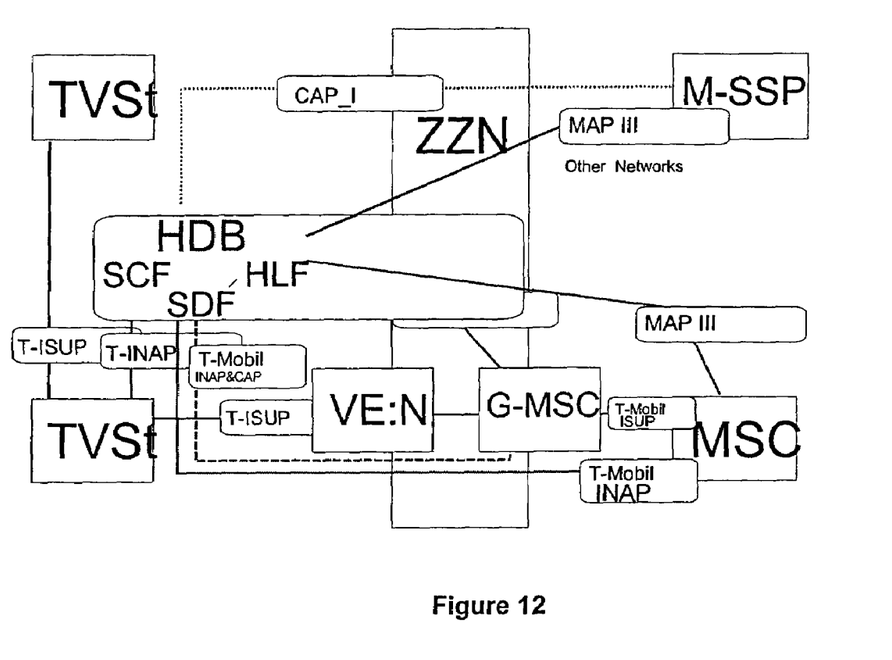
FIG. 12: is a schematic diagram of a fourth embodiment of the invention, integrating the INS and the HLR to a Home Database HDB in a node.

According to a fourth embodiment of the invention, as illustrated in FIG. 12, the HDB consists of a node with a Service Control Function (SCF) and a Home Location Function (HLF). The SCF assumes the entire communication to the exchanges of the base network (initially only TVSt, in a subsequent modification also the MSC function of the own network) and acts as a focal point for the mobility management. The HLF is responsible for adapting to the GSM interfaces (MAP). Both functions access a common database. The configuration requires a new development of the HDB.

Unlike the concept according to FIG. 7, the HDB is here combined in a network node. This eliminates communication between the INS and the HLR via a proprietary interface. This is particular advantageous in time-critical processes which have to be completed within predetermined acknowledge times. This situation arises in particular with respect to the acknowledgement of procedures of the HLR to the GSM network. Since the INS should always contain the current data of the subscriber, only the INS can send an acknowledgement (via the HLR) to the GSM network. The aforedescribed solution should be implemented as soon as possible because of its inherent simplicity.

Since the processes and peripheral conditions correspond essentially to the functions described above, they are not repeated. Each occurrence of INS/HLR should be replaced by HDB.

OVERVIEW OF ALTERNATIVE IMPLEMENTATIONS

Figure 13:
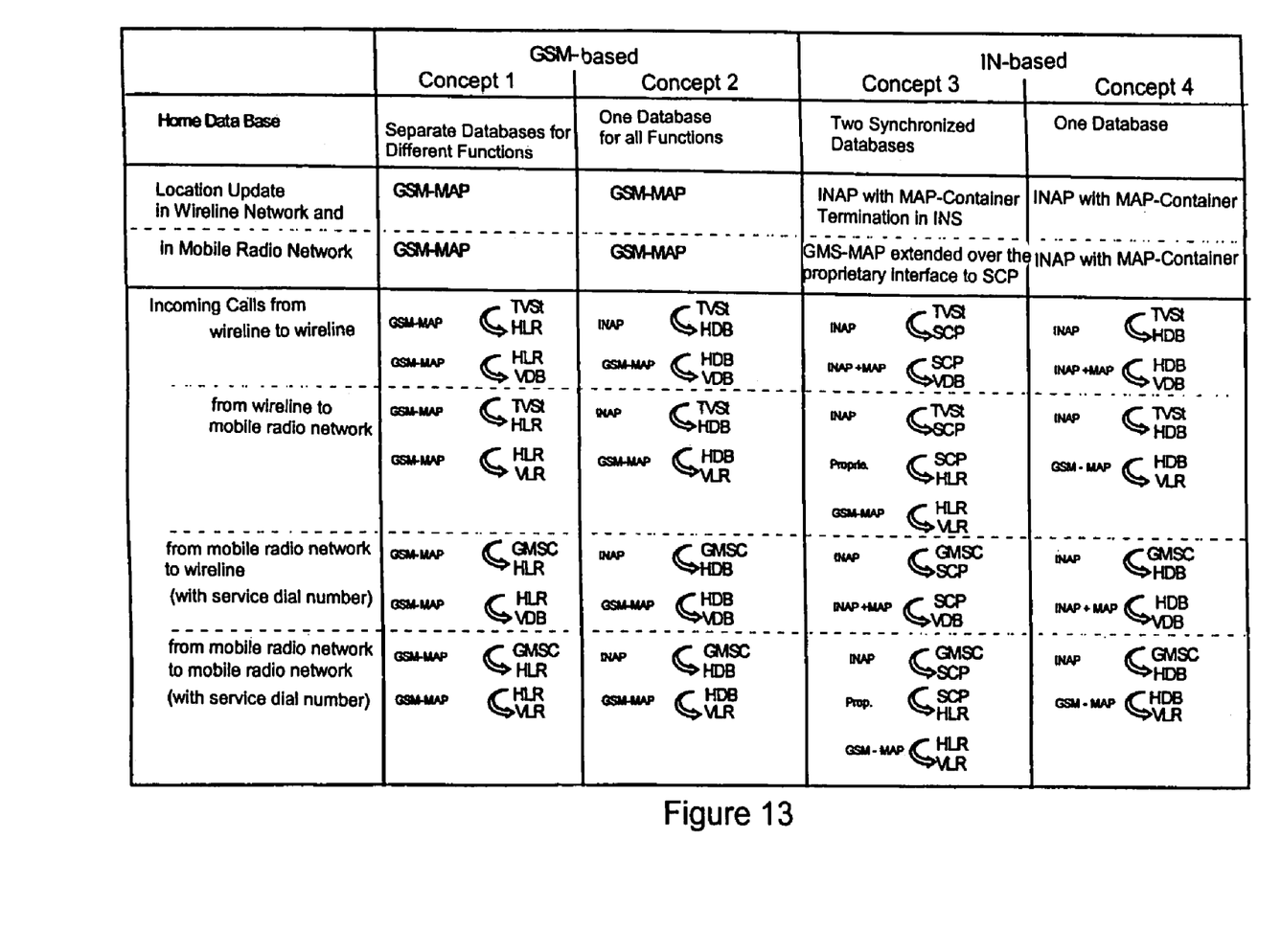
FIG. 13: is an overview of important parameters used with the aforedescribed four embodiments.

FIG. 13 provides an overview over the alternative implementations described herein.

The invention claimed is:

1. A method for connecting subscribers in a plurality of telecommunication networks under one dial number, wherein at least one of the telecommunication networks is a mobile radio communication network and at least one additional telecommunication network is a digital intelligent wireline network, comprising the steps of
storing and administering the subscriber data in a home database (HDB) of at least one of the telecommunication networks; and
making the subscriber data available to the other telecommunication networks upon request, and wherein the home database (HDB) assumes the tasks of a home location register (HLR) and an intelligent network system (INS);
wherein the home location register (HLR) and the intelligent network system (INS) are not coupled with each other and assume separate functions.

2. The method according to claim 1, wherein both the home location register (HLR) and the intelligent network system (INS) communicate with exchanges of the mobile radio telecommunication network as well as with the exchanges of the wireline network via a MAP interface.

3. The method according to claim 2, wherein a subscriber profile of the home location register (HLR) and the visitor location register (VLR) of the mobile radio telecommunication network is expanded in such a way that the existing services of the wireline network can be mapped.

4. The method according to claim 3, wherein signaling between terminals and the exchanges of the wireline network is performed via a control channel (D-channel) augmented by mobility functions (α-interface).

5. The method according to claim 4, wherein the functions of the mobility management of the mobile radio communication network are extended to the wireline network.

6. The method according to claim 5, wherein a MAP implementation with interworking to the α-interface is performed in the exchanges (M-TVSt) of the wireline network.

7. The method according to claim 6, wherein the terminal of the subscriber is connected to the wireline network via the home base station (HBS).

8. The method according to claim 7, wherein the terminal of the subscriber is connected to the wireline network via cordless base stations (DECT).

9. The method according to claim 8, wherein with inscription over the wireline network, the location of the subscriber is transmitted through MAP signaling to the home database (HDB) and registered therein.

10. A method for connecting subscribers in a plurality of telecommunication networks under one dial number, wherein at least one of the telecommunication networks is a mobile radio communication network and at least one additional telecommunication network is a digital intelligent wireline network, comprising the steps of
storing and administering the subscriber data in a home database (HDB) of at least one of the telecommunication networks; and
making the subscriber data available to the other telecommunication networks upon request, wherein the home database (HDB) is implemented as a Service Data Point (SDP) which assumes the tasks of a HOME Location Register (HLR) and a Service Control Function (SCF), wherein the Home Location Register (HLR) and the Service Control Function (SCF) are not coupled with each other and assume separate functions.

11. A system for connecting subscribers in a plurality of telecommunication networks under one dial number, wherein at least one of the telecommunication networks is a mobile radio communication network and at least one additional telecommunication network is a digital intelligent wireline network, wherein for the plurality of telecommunication network there is provided at least one common Home Database (HDB) in at least one of the telecommunication networks, wherein the Home Database (HDB) comprises two separate data points, the home location register (HLR) of the mobile network and an intelligent network system (INS), wherein the home location register (HLR) and the intelligent network system (INS) are not coupled with each other and assume separate functions.

12. The system according to claim 11, wherein a respective visitor data base (VDB) is arranged in an exchange of the telephone network and wherein the visitor data base (VDB) communicates with the home data base (HDB) and relevant portions of the subscriber data are temporarily administered in the visitor database.

13. A system for connecting subscribers in a plurality of telecommunication networks under one dial number, wherein at least one of the telecommunication networks is a mobile radio communication network and at least one additional telecommunication network is a digital intelligent wireline network, and wherein for the plurality of telecommunication network there is provided at least one common Home Database (HDB) in at least one of the telecommunication networks, wherein the Home Database (HDB) is implemented as a Service Data Point (SDP) which comprises a Home Location Function (HLF) and a Service Control Function (SCF), wherein the Home Location Function (HLF) and the Service Control function (SCF) are not coupled with each other and assume separate functions.

14. The system according to claim 13, wherein a telecommunication terminal is a mobile terminal which supports at least one of a GSM standard and a DECT standard.

15. The system according to claim 11, wherein the mobile radio communication network is a GSM mobile radio communication network.

16. The method according to claim 1, wherein the mobile radio communication network is a GSM mobile radio communication network.

17. The method according to claim 10, wherein the mobile radio communication network is a GSM mobile radio communication network.

18. The system according to claim 13, wherein the mobile radio communication network is a GSM mobile radio communication network.

* * * * *

UNITED STATES PATENT AND TRADEMARK OFFICE
CERTIFICATE OF CORRECTION

PATENT NO. : 7,184,782 B1
APPLICATION NO. : 09/445665
DATED : February 27, 2007
INVENTOR(S) : Ljungstrom et al.

It is certified that error appears in the above-identified patent and that said Letters Patent is hereby corrected as shown below:

Column 20, Line 40, "HOME Location" should read --Home Location--

Column 21, Line 10, "Service Control function" should read --Service Control Function--

Signed and Sealed this

Seventeenth Day of July, 2007

JON W. DUDAS
*Director of the United States Patent and Trademark Office*